(12) United States Patent
Lemke et al.

(10) Patent No.: US 12,014,225 B2
(45) Date of Patent: Jun. 18, 2024

(54) AUTHORIZING LOWER PRIVILEGE USERS TO INVOKE PRIVILEGED CALLS

(71) Applicant: VMware LLC, Palo Alto, CA (US)

(72) Inventors: David Lemke, Mountain View, CA (US); Ravindra Kumar, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/751,279

(22) Filed: May 23, 2022

(65) Prior Publication Data

US 2023/0376364 A1     Nov. 23, 2023

(51) Int. Cl.
  *G06F 9/54*     (2006.01)
  *G06F 9/455*    (2018.01)

(52) U.S. Cl.
  CPC ......... *G06F 9/547* (2013.01); *G06F 9/45558* (2013.01); *G06F 2009/4557* (2013.01); *G06F 2009/45583* (2013.01)

(58) Field of Classification Search
  CPC ................... G06F 9/547; G06F 9/4558; G06F 2009/45583; G06F 2009/4557
  See application file for complete search history.

(56) References Cited

U.S. PATENT DOCUMENTS

| | | | |
|---|---|---|---|
| 7,996,836 B1* | 8/2011 | McCorkendale | H04L 63/1408 718/1 |
| 8,950,007 B1* | 2/2015 | Teal | H04L 63/20 726/30 |
| 2010/0042980 A1* | 2/2010 | Wright | G06F 8/4443 717/146 |
| 2010/0281273 A1* | 11/2010 | Lee | G06F 21/72 713/193 |
| 2010/0306766 A1* | 12/2010 | Schneider | G06F 9/45533 718/1 |
| 2019/0286574 A1* | 9/2019 | Chen | H04L 67/1097 |
| 2020/0175155 A1* | 6/2020 | Bhamidipati | H04L 9/50 |
| 2021/0019393 A1* | 1/2021 | Michalevsky | G06F 21/57 |
| 2021/0329075 A1* | 10/2021 | Sardesai | H04L 9/3239 |
| 2023/0177201 A1* | 6/2023 | Durand | H04L 63/205 726/4 |

\* cited by examiner

*Primary Examiner* — Charles E Anya
(74) *Attorney, Agent, or Firm* — King Intellectual Asset Management (57) ABSTRACT

Solutions for enabling lower privilege users (e.g., applications, virtualized computing environment applications such as virtual machines or containers) to perform requests for service (e.g., remote procedure calls) that require higher privilege include: receiving, by a relay service executing at a first privilege level, from an application executing at a lower privilege level, a received request for service. The first privilege level is sufficient for the request, however, the application's privilege level is insufficient. The relay service determines whether the application is authorized to perform the request by comparing the application identity and the request with privilege exception information (e.g., a list of application identities and corresponding requests that are subject to privilege exception). If the application's request is authorized, the relay service relays the request (e.g., as a hypercall) to a destination service at the relay's service own privilege level and then relays the received response back to the application.

17 Claims, 8 Drawing Sheets

AUTHORIZING LOWER PRIVILEGE USERS TO INVOKE PRIVILEGED CALLS

BACKGROUND

In a virtual environment, when an application (or process) needs to interact with the hypervisor, it invokes hypercalls. A hypercall is a call by a process to the hypervisor to perform some service, for example, a software trap (e.g., a software-generated interrupt requesting immediate service). Domains use hypercalls to request privileged operations, such as updating page tables. The hypervisor generally divides all guest users between two groups, root (or administrator or other high privilege) users and non-root (e.g., lower privilege) users, and restricts access to hypercalls based on privilege. For example, hypercalls may be permitted for a calling application executing in a root context, but prohibited for a calling application executing in a non-root context.

In some systems, when applications require access to restricted resources, either all applications must execute with root privilege (violating the "least privilege" security principle), or the hypervisor must make hypercalls accessible to users at all privilege levels (which is poor security hygiene). Both options are poor security choices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure provide solutions for enabling lower privilege users (e.g., applications, virtualized computing environment applications such as virtual machines or containers) to perform requests for service (e.g., remote procedure calls) that require higher privilege that include: receiving, by a relay service executing at a first privilege level, from an application executing at a lower privilege level, a received request for service. The first privilege level is sufficient for the request, however, the application's privilege level is insufficient. The relay service determines whether the application is authorized to perform the request by comparing the application identity and the request with privilege exception information (e.g., a list of application identities and corresponding requests that are subject to privilege exception). If the application's request is authorized, the relay service relays the request (e.g., as a hypercall) to a destination service at the relay's service own privilege level and then relays the received response back to the application.

BRIEF DESCRIPTION OF THE DRAWINGS

The present description will be better understood from the following detailed description read in the light of the accompanying drawings, wherein.

DETAILED DESCRIPTION

Aspects of the disclosure provide solutions for enabling lower privilege users (e.g., applications, virtualized computing environment applications such as virtual machines (VMs) or containers) to perform requests for service (e.g., remote procedure calls) that require higher privilege. A privilege level corresponds to a level of access to system resources. For example, restricted resources or services require a higher level of privilege than unrestricted resources or services. A relay service executing at a first privilege level receives, from an application executing at a lower privilege level, a request for service. The first privilege level is eligible, enabled, sufficient, or otherwise authorized for the request, however, the application's privilege level is ineligible, not enabled, insufficient, or otherwise not authorized. The relay service determines whether the application is authorized to perform the request by comparing the application identity and the request with privilege exception information (e.g., a list of application identities and corresponding requests that are subject to privilege exception). If the application's request is authorized, the relay service relays the request (e.g., as a hypercall) to a destination service at the relay's service own privilege level (which is authorized to perform the request) and then relays the received response back to the application. In some examples, a traditional authentication step may be omitted, because the communication channel itself enforces authorization.

Aspects of the disclosure improve operational security for computing operations at least by providing a security option: applications may execute at an appropriate privilege level (e.g., non-root, normal user), yet still access needed resources that are reserved for higher-privilege users (e.g., administrator or root users). This is accomplished, at least in part, by receiving a first request for service and, based on at least determining that the application is authorized, relaying the request for service with a higher privilege level. Thus, aspects of the disclosure provide a practical, useful result to solve a technical problem in the domain of trusted computing.

Figure 1:
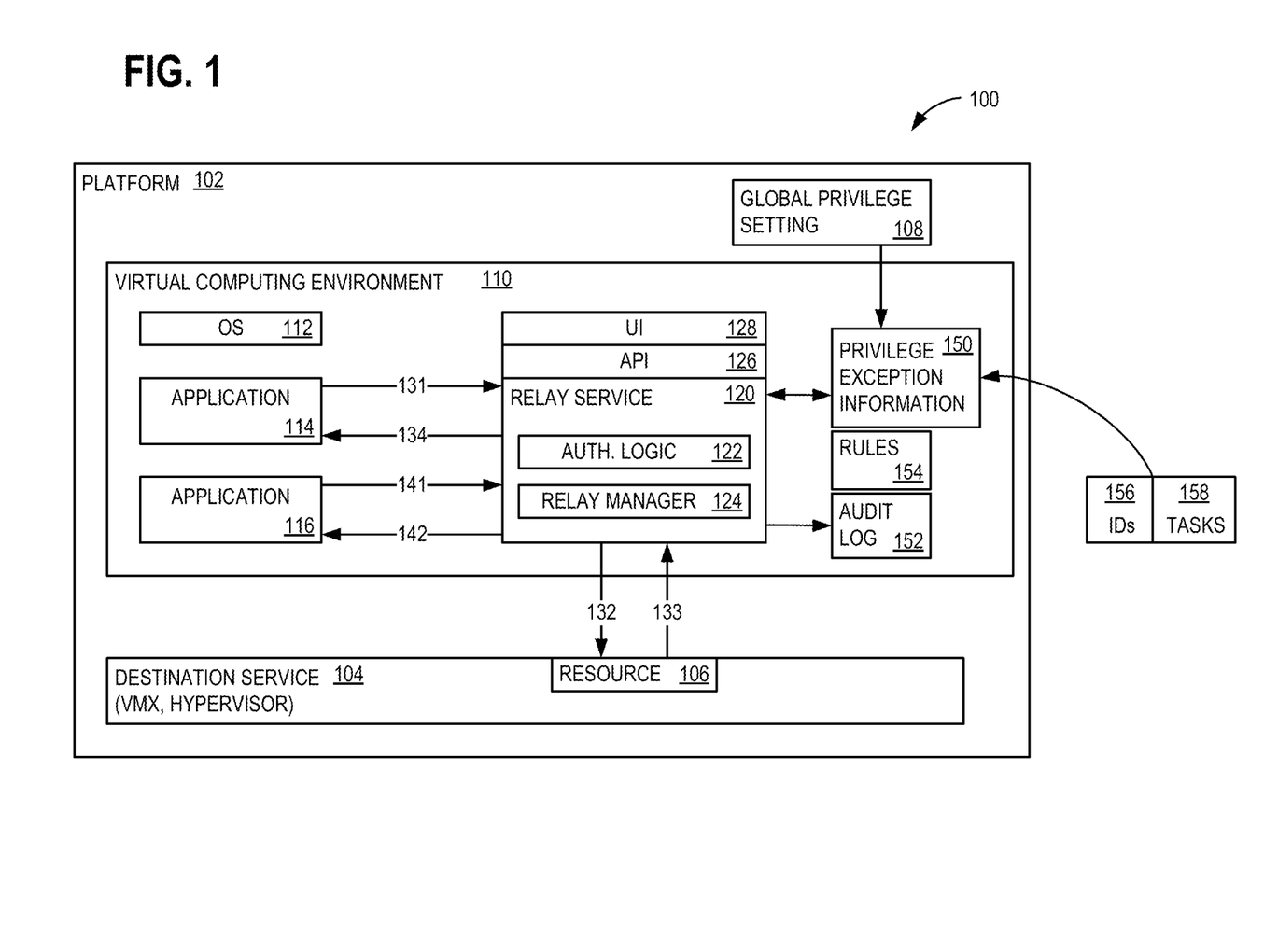
FIG. 1 illustrates an architecture that may advantageously authorize lower privilege users to invoke privileged calls.
Figure 2:
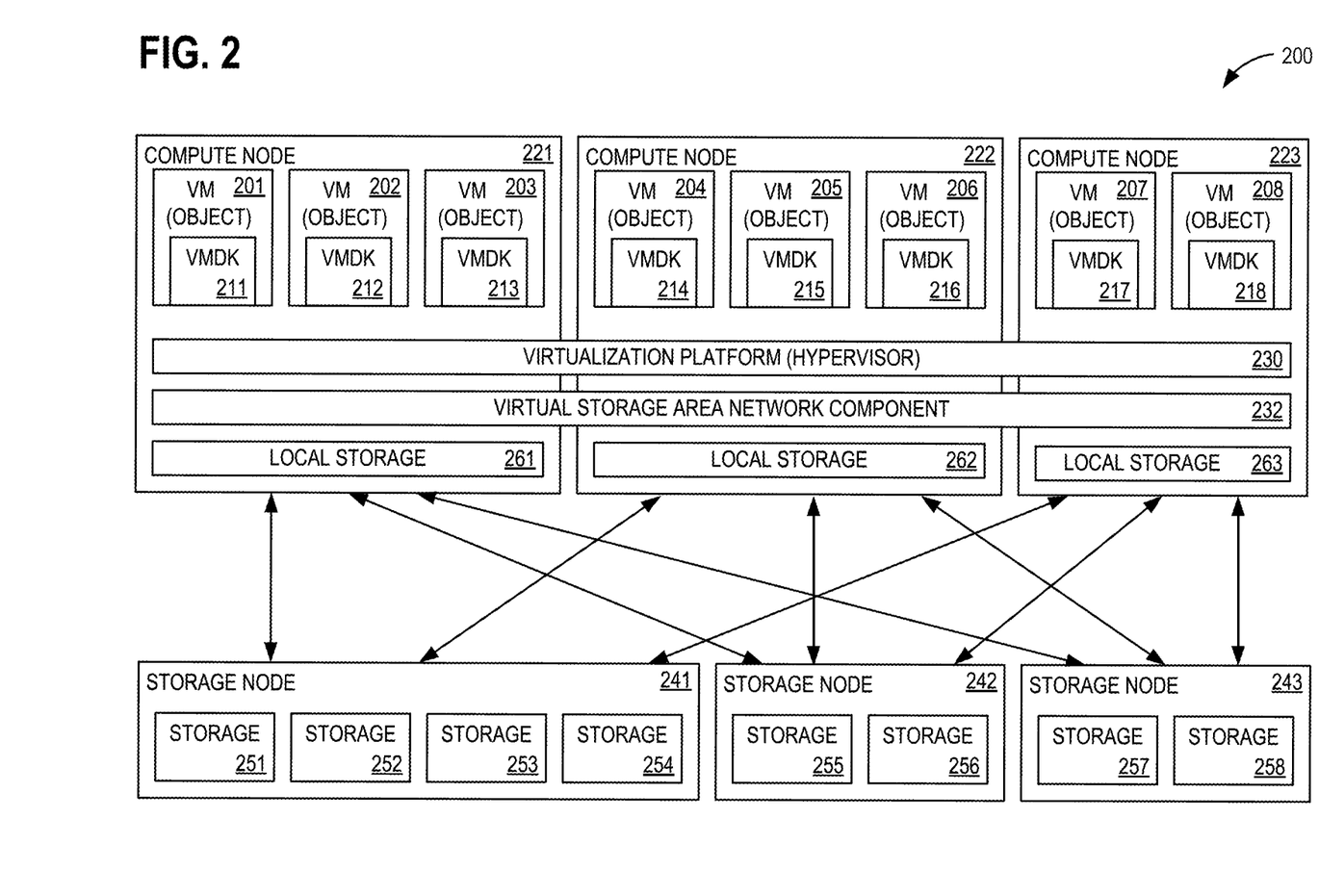
FIG. 2 illustrates further detail for some examples of the architecture of FIG. 1.

FIG. 1 illustrates an example architecture 100 that may advantageously authorize lower privilege users to invoke privileged calls (e.g., skipping traditional authentication, because the communication channel itself enforces authorization). Architecture 100 uses a computing platform 102 which may be implemented on one or more computing apparatus 818 of FIG. 8, and/or using a virtualization architecture 200 as is illustrated in FIG. 2. In the illustrated example, computing platform 102 hosts a virtual computing environment 110 and a destination service 104 that holds resource 106. An application 114 and an application 116 within computing platform 102 (e.g., within virtual computing environment 110) are executing at a normal user privilege level (e.g., not root, administrator, superuser, or supervisor) and are attempting to access information within resource 106. As described below, application 114 is successful in its attempt, and application 116 is unsuccessful in its attempt.

In some examples, virtual computing environment 110 comprises a VM (see FIG. 3A) or a container (see FIG. 3B) and has its own operating system (OS) 112. In some examples, destination service 104 comprises a hypervisor that manages VMs or a virtual machine executable (VMX) process that handles interfaces with entities outside of virtual computing environment 110. In some examples, such as non-virtualized examples (see FIG. 3C), destination service 104 is part of a separate computing platform across a computer network.

Both application 114 and application 116 may need to access information published in key value store by another user. However, destination service 104 restricts access to resource 106 to only users that are executing at a higher privilege level, such as root, administrator, superuser, or supervisor. A relay service 120 acts as a proxy for requests for service, using its own privilege level in place of that of the original requester (e.g., application 114) when the original requester is identified as being authorized for the specific request for service in privilege exception information 150. In this illustrated example of FIG. 1, application 114 is successful in retrieving information from resource 106, due to relay service 120 assisting application 114, whereas application 116 is unsuccessful and instead receives a failure indication 142 from relay service 120.

During operation of architecture 100, application 114 transmits request for service 131 to relay service 120, using the privilege level of application 114 (e.g., its own privilege level). This privilege level is insufficient to access resource 106. Upon reception of request for service 131 by relay service 120, an authorization logic 122 within relay service 120 determines whether privilege exception information 150 indicates that application 114 is authorized to perform request for service 131. Because application 114 is executing at a lower privilege level, the general rule is that application 114 is not authorized to perform any request for service from resource 106. However, privilege exception information 150 provides for a limited set of exceptions for application 114 to make certain requests for service, such as retrieving certain information (but not writing or changing certain information). This permits application 114 to access what it needs, at a higher privilege level, but only what has been predetermined (either explicitly in a list, or through a set of rules), thereby preserving security. That is, the lower privilege level of application 114 still functions to prevent application 114 from accessing resources that are not pre-authorized.

Because authorization logic 122 determines that application 114 is authorized, a relay manager 124 within relay service 120 then converts incoming request for service 131 into a relayed request for service 132 (e.g., changing the privilege level) and relays it to destination service 104. Destination service 104 sees relayed request for service 132 at the privilege level of relay service 120, rather than at the lower privilege level of application 114. Although virtual computing environment 110 and computing platform 102 operate under different authentication schemes, destination service 104 trusts relay service 120. This is because relay service 120 is executing at a sufficient privilege level, within virtual computing environment 110, which matches the privilege level within destination service 104 that is required to access resource 106.

Destination service 104 processes relayed request for service 132 and returns response 133. Relay manager 124, recognizing that response 133 is a response to relayed request for service 132, and ultimately the received request for service 131, relays response 133 to application 114 as relayed response 134.

However, in this illustrated example, when application 116 transmits request for service 141 to relay service 120, using the privilege level of application 116 (e.g., its own privilege level, which is insufficient to access resource 106), a different result occurs. Upon reception of request for service 141, authorization logic 122 determines whether privilege exception information 150 indicates that application 116 is authorized to perform request for service 141. In this case, either request for service 141 is outside the set of requests for service for which application 116 is authorized, or else application 116 has not yet been added to privilege exception information 150. Thus, authorization logic 122 determines that application 116 is not authorized to perform request for service 141, and returns failure indication 142 to application 116. In some examples, relay manager 124 keeps an audit log 152 that tracks approved (e.g., relayed) and denied requests for service. In such examples, audit log 152 keeps records of some or all of requests for service 131 and 141, relayed request for service 132, response 133, relayed response 134, and failure indication 142.

In some examples, request for service 131 (and 141) is a remote procedure call (RPC) or an application programming interface (API) call and the relayed request for service comprises a hypercall. In some examples, destination service 104 comprises a host OS, such as an OS of computing platform 102. Although FIG. 1 shows relay service 120 operating in a virtualized environment (e.g., virtual computing environment 110) and destination service 104 is on a common platform (e.g., computing platform 102) with relay service 120, this privilege proxy scheme may be extended to interfaces between two privilege domains even for non-virtualized environments, as indicated in FIG. 3C. Further, in some examples, relay service 120 accepts requests for service 131 and 141 over a secure socket, pipe or other secure inter-process communication mechanism, permitting relay service 120 to be located elsewhere, other than on computing platform 102. Such a remote implementation of relay service 120 may use representational state transfer (REST) authentication.

Relay service 120 is configured to specify which users (e.g., applications 114 and 116) are allowed to execute which secure RPCs (or other requests), and then forward them to destination service 104. This provides control over which calls will and will not be relayed, based on what is within privilege exception information 150. In some examples, privilege exception information 150 comprises a predetermined list of application identities 156 (e.g., identifiers of applications 114 and 116) and corresponding requests for service (tasks 158) that are subject to privilege exception (e.g., authorized). In some examples, identifiers of applications 114 and 116 comprise user identifiers (UIDs) or universally unique identifiers (UUIDs). The corresponding requests for service for each user (e.g., application, process) may be specifically enumerated RPCs, based upon which tasks are determined to be necessary for each user. In such examples, privilege exception information 150 may be a set of key-value pairs stored as a list, with the keys being application identities and the values being the authorized requests for service.

In some examples, privilege exception information 150 is stored in a database, a plain text configuration file or another persistent storage solution. In some examples, privilege exception information 150 is co-located with relay service 120 (e.g., within virtual computing environment 110), although in some examples, privilege exception information 150 is not co-located with relay service 120. In some examples, privilege exception information 150 is initially stored in a global privilege setting node 108, and is either pushed to virtual computing environment 110, or else is retrieved by relay service 120. In some examples, privilege exception information 150 is shared globally among multiple relay services 120 (e.g., in multiple virtual computing environments 110, each running its own versions of applications 114 and 116). In some examples, privilege exception information 150 is stored in a blockchain as an information security measure.

In some examples, privilege exception information 150 is generated (e.g., user name and authorized requests for service) in real-time based on a set of exception rules 154, rather than being a static list. In some example, an API 126 is used to permit security or administrator users to edit privilege exception information 150 or set of exception rules 154, e.g., by adding and removing users and tasks for those users. In some example, a user interface (UI) 128 is provided to facilitate editing privilege exception information 150 or set of exception rules 154, for example, to simplify accessing API 126 or to write out a new list or rule directly.

In the example described above, in which request for service 141 from application 116 is denied, a security or administrator user may edit privilege exception information 150 using UI 128 and/or API 126 so that a future request for service from application 116, identical to request for service 141, will be authorized and relayed by relay service 120.

Examples of architecture 100 are operable with virtualized and non-virtualized storage solutions. FIG. 2 illustrates a virtualization architecture 200 that may be used as a version of computing platform 102. Virtualization architecture 200 is comprised of a set of compute nodes 221-223, interconnected with each other and a set of storage nodes 241-243 according to an embodiment. In other examples, a different number of compute nodes and storage nodes may be used. Each compute node hosts multiple objects, which may be virtual machines (VMs, such as base objects, linked clones, and independent clones), containers, applications, or any compute entity (e.g., computing instance or virtualized computing instance) that consumes storage. When objects are created, they may be designated as global or local, and the designation is stored in an attribute. For example, compute node 221 hosts objects 201, 202, and 203; compute node 222 hosts objects 204, 205, and 206; and compute node 223 hosts objects 207 and 208. Some of objects 201-208 may be local objects. In some examples, a single compute node may host 50, 100, or a different number of objects. Each object uses a VM disk (VMDK), for example VMDKs 211-218 for each of objects 201-208, respectively. Other implementations using different formats are also possible. A virtualization platform 230, which includes hypervisor functionality at one or more of compute nodes 221, 222, and 223, manages objects 201-208. In some examples, various components of virtualization architecture 200, for example compute nodes 221, 222, and 223, and storage nodes 241, 242, and 243 are implemented using one or more computing apparatus such as computing apparatus 818 of FIG. 8.

Virtualization software that provides software-defined storage (SDS), by pooling storage nodes across a cluster, creates a distributed, shared data store, for example a storage area network (SAN). Thus, objects 201-208 may be virtual SAN (vSAN) objects. In some distributed arrangements, servers are distinguished as compute nodes (e.g., compute nodes 221, 222, and 223) and storage nodes (e.g., storage nodes 241, 242, and 243). Although a storage node may attach a large number of storage devices (e.g., flash, solid state drives (SSDs), non-volatile memory express (NVMe), Persistent Memory (PMEM), quad-level cell (QLC)) processing power may be limited beyond the ability to handle input/output (I/O) traffic. Storage nodes 241-243 each include multiple physical storage components, which may include flash, SSD, NVMe, PMEM, and QLC storage solutions. For example, storage node 241 has storage 251, 252, 252, and 254; storage node 242 has storage 255 and 256; and storage node 243 has storage 257 and 258. In some examples, a single storage node may include a different number of physical storage components.

In the described examples, storage nodes 241-243 are treated as a SAN with a single global object, enabling any of objects 201-208 to write to and read from any of storage 251-258 using a virtual SAN component 232. Virtual SAN component 232 executes in compute nodes 221-223. Using the disclosure, compute nodes 221-223 are able to operate with a wide range of storage options. In some examples, compute nodes 221-223 each include a manifestation of virtualization platform 230 and virtual SAN component 232. Virtualization platform 230 manages the generating, operations, and clean-up of objects 201 and 202. Virtual SAN component 232 permits objects 201 and 202 to write incoming data from object 201 and incoming data from object 202 to storage nodes 241, 242, and/or 243, in part, by virtualizing the physical storage components of the storage nodes.

Figure 3A:
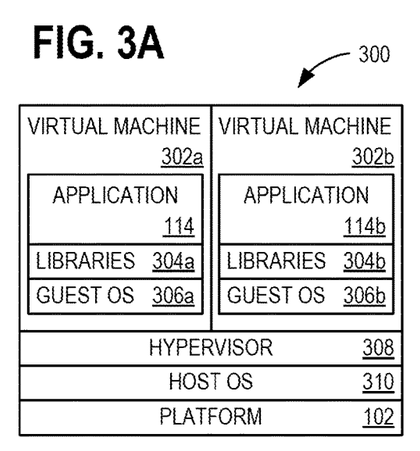
FIGS. 3A, 3B, and 3C illustrate example virtualized and non-virtualized options for elements shown in the architecture of FIG. 1.
Figure 3B:
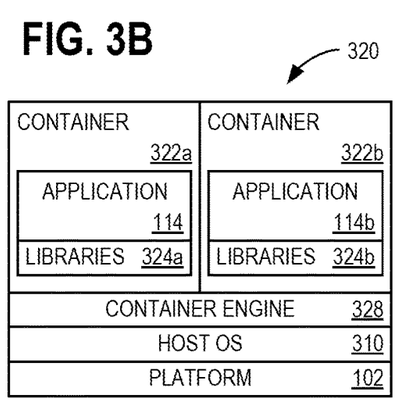
Figure 3C:
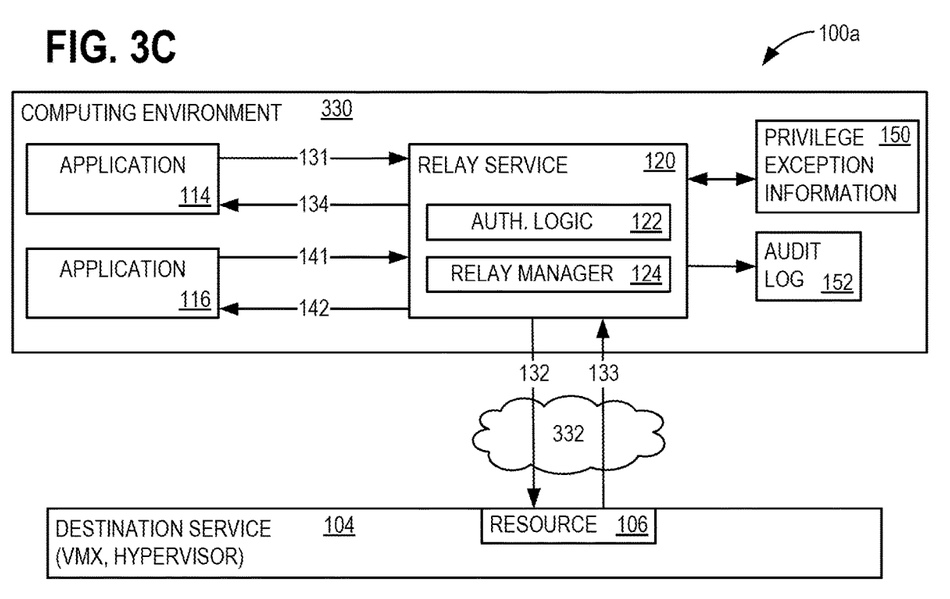

FIGS. 3A, 3B, and 3C illustrate example virtualized and non-virtualized options for elements shown in architecture 100. FIG. 3A shows an arrangement 300 in which virtual computing environment 110 comprises a VM 302a. VM 302a runs application 114, and has its own libraries 304a and an OS 306a (e.g. a guest OS) and executes under the control of a hypervisor 308 (which represents destination service 104, in some examples). Another VM 302b is similarly configured to run an application 114b (which may be a copy of application 114), and has its own libraries 304b and an OS 306b (e.g., a guest OS) and also executes under the control of hypervisor 308. If hypervisor 308 is a type 2 hypervisor, computing platform 102 requires its own OS 310, which may also represent destination service 104, in some examples. If privilege exception information 150 is global, relay services 120 on each of VMs 302a and 302b will share it, otherwise, each of VMs 302a and 302b has its own local copy of privilege exception information 150.

FIG. 3B shows an arrangement 320 in which virtual computing environment 110 comprises a container 322a. Container 322a runs application 114, has its own libraries 324a, and executes under the control of a container engine 328 (which represents destination service 104, in some examples). Another container 322b is similarly configured to run application 114b, has its own libraries 324b, and also executes under the control of container engine 328. Unlike VMs, containers may not have a complete OS. Computing platform 102 has its own OS 310, which may also represent destination service 104, in some examples. If privilege exception information 150 is global, relay services 120 on each of containers 322a and 322b will share it, otherwise, each of containers 322a and 322b has its own local copy of privilege exception information 150.

FIG. 3C depicts an architecture 100a in which a computing platform 330 (representing computing platform 102) does not use virtualization and applications 114 and 116, along with relay service 120, run on hardware solutions. In architecture 100a, destination service 104 comprises a remote service across a computer network 332, and relaying relayed request for service 132 comprises relaying relayed request for service 132 to a remote node across computer network 332. In such examples, relaying relayed request for service 132 may use transmission control protocol/internet protocol (TCP/IP). Further references to architecture 100 should be understood to also refer to architecture 100a.

Figure 4:
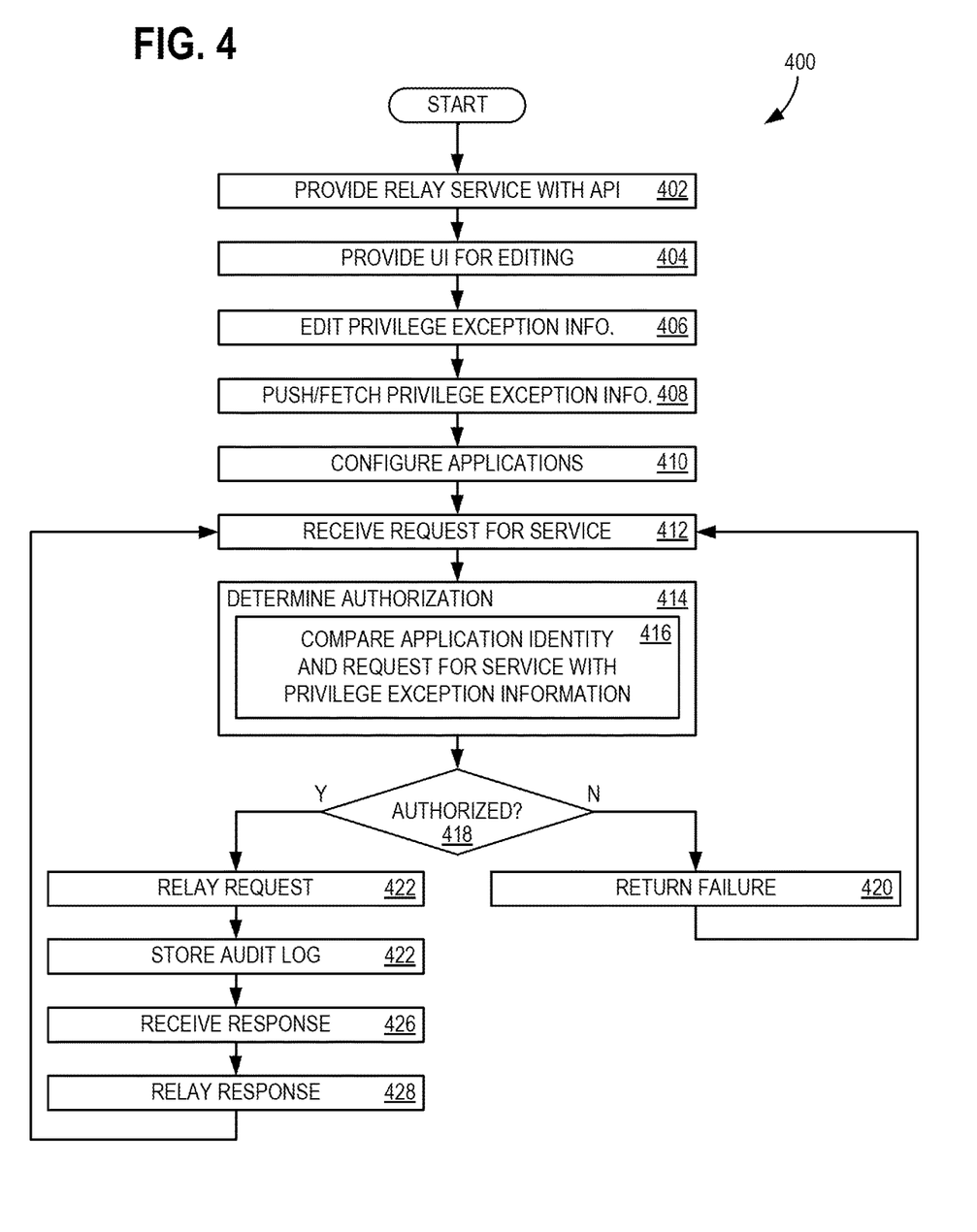
FIG. 4 illustrates a flowchart of exemplary operations associated with examples of the architecture of FIG. 1.

FIG. 4 illustrates a flowchart 400 of exemplary operations associated with architecture 100. In some examples, the operations of flowchart 400 are performed by one or more computing apparatus 818 of FIG. 8. Flowchart 400 commences with operation 402, which includes providing relay service 120 and API 126 for relay service 120. API 126 may be used for both editing privilege exception information 150 and also for requests for service 131 and 141 (e.g., as API calls). Operation 404 includes providing UI 128 for editing the predetermined list of application identities 156 or set of exception rules 154.

In operation 406, a security or administrator user edits predetermined list of application identities 156 and corresponding requests for service subject to privilege exception (tasks 158) or edits set of exception rules 154. If privilege exception information 150 is not already local to relay service 120, operation 408 pushes privilege exception information 150 to environment running relay service 120 or, in some examples, relay service 120 fetches privilege exception information 150. In operation 410, security or administrator user (or an automated process) configures each of a plurality of applications (e.g., applications 114 and 116) to use relay service 120 or to bypass relay service 120, based on at least the privilege level of each application. In some examples, applications that execute at root privilege do not use relay service, because such applications already have sufficient privilege.

Two passes through the flowchart, from operations 414 through the end are described: one pass in which application 114 is successful in accessing resource 106, and one pass in which application 116 is unsuccessful in accessing resource 106.

In the first pass, operation 412 includes receiving, by relay service 120 executing at the first privilege level, from application 114 (e.g., a virtualized computing environment application, in some examples) executing at a second privilege level lower than the first privilege level, request for service 131. The first privilege level is sufficient for request for service 131 and the second privilege level is insufficient for request for service 131. In some examples, application 114 comprises a VM application. In some examples, application 114 comprises a container. In some examples, request for service 131 comprises an RPC. In some examples, request for service 131 comprises an API call. In some examples, application 114 and relay service 120 both execute in the virtual environment (e.g., a common virtual environment). In some examples, the first privilege level comprises a privilege selected from the list consisting of: root, administrator, superuser, and supervisor. In some examples, the second privilege level comprises non-root or non-administrator user privilege. In some examples, relayed request for service 132 comprises a hypercall.

Operation 414 determines whether application 114 is authorized to perform request for service 131, and is performed using operation 416. In some examples, a traditional authentication step may be omitted, because the communication channel itself (e.g., through relay service 120 to/from destination service 104) enforces authorization. Operation 416 compares the identity of application 114 and request for service 131 with privilege exception information 150. In some examples, privilege exception information 150 comprises predetermined list of application identities 156 (e.g., a predetermined list of virtualized computing environment application identities) and corresponding requests for service subject to privilege exception (tasks 158). In some examples, determining that application 114 is authorized to perform request for service 131 comprises generating privilege exception information 150 based on at least set of exception rules 154.

Decision operation 418 acts on the determination made in operation 414. If the application is not authorized (as described below for the second pass), flowchart 400 moves to operation 420, and relay service 120 returns a failure indication. However, in this first pass, operation 414 determining that application 114 is authorized to perform request for service 131 (e.g., based on at least receiving request for service 131). Operation 422 includes, based on at least determining that application 114 is authorized to perform request for service 131, relaying request for service 131 to destination service 104 as relayed request for service 132, relayed request for service 132 having the first privilege level. In some examples, destination service 104 comprises a hypervisor. In some examples, destination service 104 comprises a VMX process. In some examples, destination service 104 comprises an OS (e.g., a host OS). In some examples, destination service 104 comprises a remote service across computer network 332, and relaying relayed request for service 132 comprises relaying relayed request for service 132 to a remote node across computer network 332. In some examples, relaying relayed request for service 132 comprises relaying relayed request for service 132 using TCP/IP.

Operation 424 stores a log of received requests for service for which a relayed request for service is performed and/or a log of received requests for service for which a relayed request for service is not performed in audit log 152. After destination service 104 performs flowchart 600 of FIG. 6, relay service 120 receives response 133 to relayed request for service 132 from destination service 104 in operation 426. Based on at least receiving response 133 to relayed request for service 132, relay service 120 relays received response 133 to application 114 in operation 428.

The second pass through flowchart 400, starting at operation 412 is now described for application 116 transmitting request for service 141, which is not authorized and thus will not be granted the privilege exception. Operation 412 includes receiving, by relay service 120, from application 116 executing at the second privilege level, request for service 141, wherein the second privilege level is insufficient for request for service 141. Based on at least receiving request for service 141, operation 414 determines that application 116 is not authorized to perform request for service 141 (e.g., by comparing the identity of application 116 and request for service 141 with privilege exception information 150). Decision operation 418 steers flowchart 400 to operation 420, which includes, based on at least determining that application 116 is not authorized to perform request for service 141, returning failure indication 142 to application 116.

Figure 5:
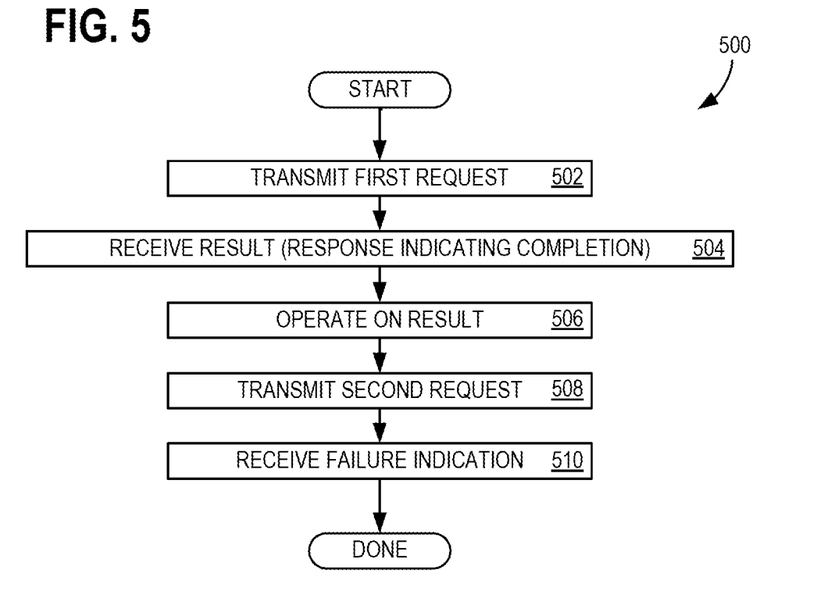
FIG. 5 illustrates another flowchart of exemplary operations associated with examples of the architecture of FIG. 1.

FIG. 5 illustrates a flowchart 500 of exemplary operations associated with architecture 100 from the perspective of applications 114 and 116 (e.g., the user perspective). In some examples, the operations of flowchart 500 are performed by one or more computing apparatus 818 of FIG. 8. Flowchart 500 commences with operation 502, which includes transmitting, to relay service 120 executing at the first privilege level, by application 114 executing at the second privilege, request for service 131, wherein the first privilege level is sufficient for request for service 131 and the second privilege level is insufficient for request for service 131.

Operation 504 includes receiving, from relay service 120, by application 114, relayed response 134 indicating completion of request for service 131. In operation 506, application 114 operates on relayed response 134.

Operation 508 includes transmitting, to relay service 120, by application 116 executing at the second privilege level, request for service 141. Operation 510 includes receiving, from relay service 120, by application 116, failure indication 142.

Figure 6:
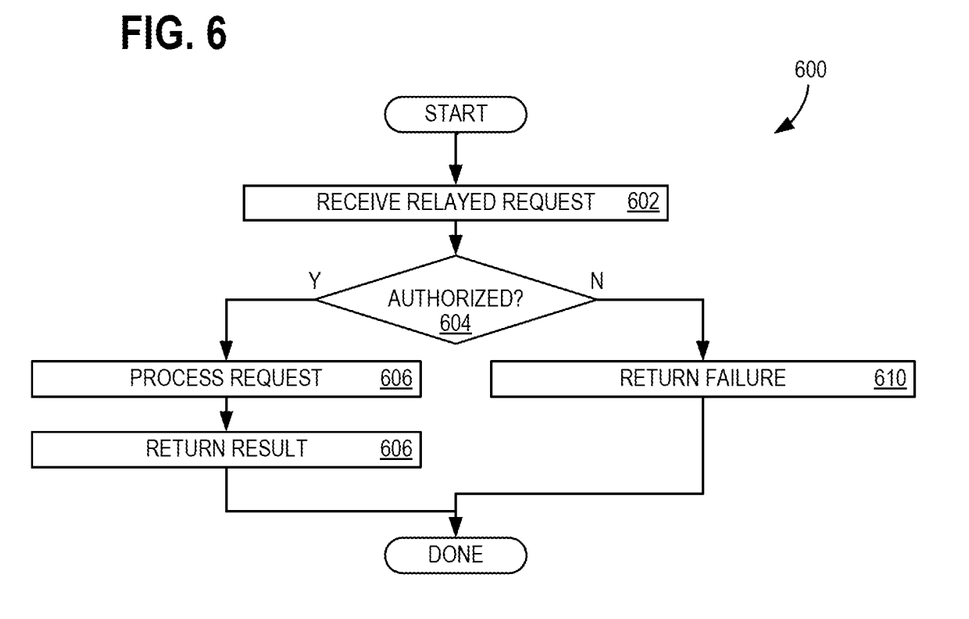
FIG. 6 illustrates another flowchart of exemplary operations associated with examples of the architecture of FIG. 1.

FIG. 6 illustrates a flowchart 600 of exemplary operations associated with architecture 100 from the perspective of destination service 104. In some examples, the operations of flowchart 600 are performed by one or more computing apparatus 818 of FIG. 8. Flowchart 600 commences with operation 602, which includes receiving, by destination service 104, relayed request for service 132 having the first privilege level. Decision operation 604 determines (e.g., by destination service 104) whether relayed request for service 132 has a sufficient privilege level.

If so, then based on decision operation 604 determining that relayed request for service 132 has a sufficient privilege level, destination service 104 processes relayed request for service 132 in operation 606. Operation 608 transmits response 133 to relayed request for service 132 to relay service 120. Otherwise, if there is insufficient privilege, operation 610 transmits failure indication 142 to relay service 120.

Figure 7A:
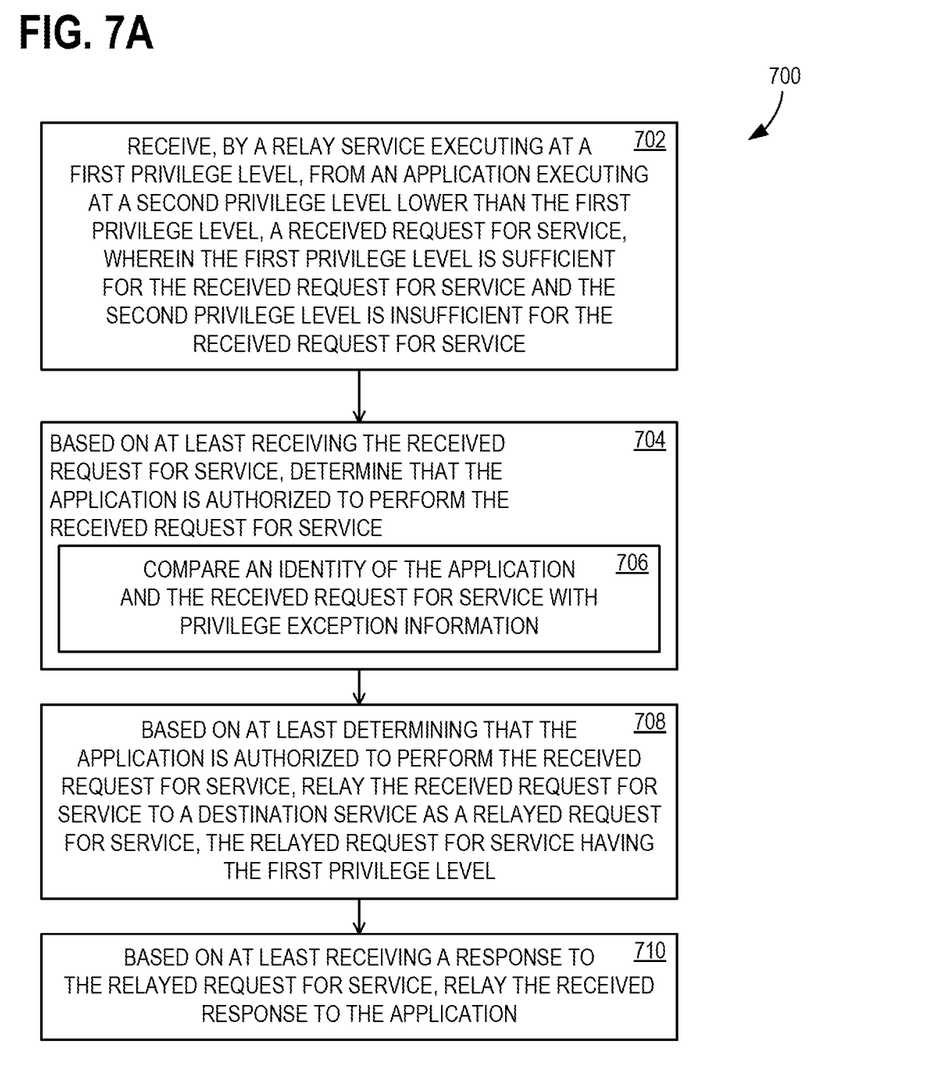
FIGS. 7A and 7B illustrate additional flowcharts of exemplary operations associated with the architecture of FIG. 1.

FIG. 7A illustrates a flowchart 700 of exemplary operations associated with architecture 100. In some examples, the operations of flowchart 700 are performed by one or more computing apparatus 818 of FIG. 8. Flowchart 700 commences with operation 702, which includes receiving, by a relay service executing at a first privilege level, from an application (e.g., a virtualized computing environment application) executing at a second privilege level lower than the first privilege level, a received request for service, wherein the first privilege level is sufficient for the received request for service and the second privilege level is insufficient for the received request for service.

Operation 704 includes, based on at least receiving the received request for service, determining that the application is authorized to perform the received request for service. Operation 704 is performed using operation 706, which includes comparing an identity of the application and the received request for service with privilege exception information. Operation 708 includes, based on at least determining that the application is authorized to perform the received request for service, relaying the received request for service to a destination service as a relayed request for service, the relayed request for service having the first privilege level. Operation 710 includes, based on at least receiving a response to the relayed request for service, relaying the received response to the application.

Figure 7B:
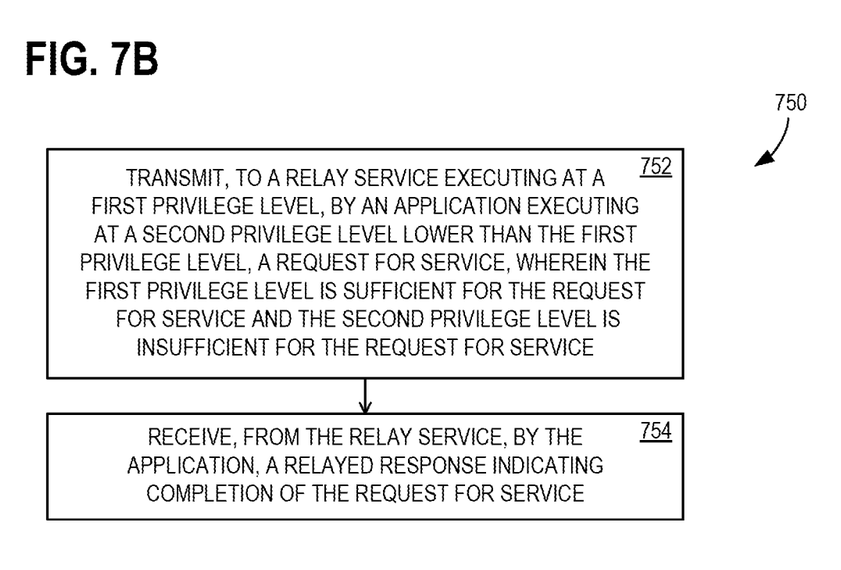

FIG. 7B illustrates a flowchart 750 of exemplary operations associated with architecture 100. In some examples, the operations of flowchart 750 are performed by one or more computing apparatus 818 of FIG. 8. Flowchart 750 commences with operation 752, which includes transmitting, to a relay service executing at a first privilege level, by an application (e.g., a virtualized computing environment application) executing at a second privilege level lower than the first privilege level, a request for service, wherein the first privilege level is sufficient for the request for service and the second privilege level is insufficient for the request for service. Operation 754 includes receiving, from the relay service, by the application, a relayed response indicating completion of the request for service.

Additional Examples

An example method of privilege enforcement for virtual environments comprises: receiving, by a relay service executing at a first privilege level, from a first virtualized computing environment application executing at a second privilege level lower than the first privilege level, a first received request for service, wherein the first privilege level is sufficient for the first received request for service and the second privilege level is insufficient for the first received request for service; based on at least receiving the first received request for service, determining that the first virtualized computing environment application is authorized to perform the first received request for service, wherein the determining comprises: comparing an identity of the first virtualized computing environment application and the first received request for service with privilege exception information; based on at least determining that the first virtualized computing environment application is authorized to perform the first received request for service, relaying the first received request for service to a destination service as a relayed request for service, the relayed request for service having the first privilege level; and based on at least receiving a response to the relayed request for service, relaying the received response to the first virtualized computing environment application.

An example computer system comprises: a processor; and a non-transitory computer readable medium having stored thereon program code executable by the processor, the program code causing the processor to: receive, by a relay service executing at a first privilege level, from a first virtualized computing environment application executing at a second privilege level lower than the first privilege level, a first received request for service, wherein the first privilege level is sufficient for the first received request for service and the second privilege level is insufficient for the first received request for service; based on at least receiving the first received request for service, determine that the first virtualized computing environment application is authorized to perform the first received request for service, wherein the determining comprises: compare an identity of the first virtualized computing environment application and the first received request for service with privilege exception information; based on at least determining that the first virtualized computing environment application is authorized to perform the first received request for service, relay the first received request for service to a destination service as a relayed request for service, the relayed request for service having the first privilege level; and based on at least receiving a response to the relayed request for service, relay the received response to the first virtualized computing environment application.

An example non-transitory computer storage medium has stored thereon program code executable by a processor, the program code embodying a method comprising: receiving, by a relay service executing at a first privilege level, from a first virtualized computing environment application executing at a second privilege level lower than the first privilege level, a first received request for service, wherein the first privilege level is sufficient for the first received request for service and the second privilege level is insufficient for the first received request for service; based on at least receiving the first received request for service, determining that the first virtualized computing environment application is authorized to perform the first received request for service, wherein the determining comprises: comparing an identity of the first virtualized computing environment application and the first received request for service with privilege exception information; based on at least determining that the first virtualized computing environment application is authorized to perform the first received request for service, relaying the first received request for service to a destination service as a relayed request for service, the relayed request for service having the first privilege level; and based on at least receiving a response to the relayed request for service, relaying the received response to the first virtualized computing environment application.

Another example method comprises: transmitting, to a relay service executing at a first privilege level, by a first virtualized computing environment application executing at a second privilege level lower than the first privilege level, a first request for service, wherein the first privilege level is sufficient for the first request for service and the second privilege level is insufficient for the first request for service; and receiving, from the relay service, by the first virtualized computing environment application, a relayed response indicating completion of the first request for service.

An example method of privilege enforcement comprises: receiving, by a relay service executing at a first privilege level, from a first application executing at a second privilege level lower than the first privilege level, a first received request for service, wherein the first privilege level is sufficient for the first received request for service and the second privilege level is insufficient for the first received request for service; based on at least receiving the first received request for service, determining that the first application is authorized to perform the first received request for service, wherein the determining comprises: comparing an identity of the first application and the first received request for service with privilege exception information; based on at least determining that the first application is authorized to perform the first received request for service, relaying the first received request for service to a destination service as a relayed request for service, the relayed request for service having the first privilege level; and based on at least receiving a response to the relayed request for service, relaying the received response to the first application.

Another example computer system comprises: a processor; and a non-transitory computer readable medium having stored thereon program code executable by the processor, the program code causing the processor to perform a method disclosed herein. Another example non-transitory computer storage medium has stored thereon program code executable by a processor, the program code embodying a method disclosed herein.

Alternatively, or in addition to the other examples described herein, examples include any combination of the following:

- the first virtualized computing environment application comprises a VM application;
- the first virtualized computing environment application comprises a container;
- the first received request for service comprises an RPC;
- the first received request for service comprises an API call;
- the relayed request for service comprises a hypercall;
- the first privilege level comprises a privilege selected from the list consisting of: root, administrator, super-user, and supervisor;
- the second privilege level comprises non-root or non-administrator user privilege;
- receiving, by the relay service, from a second virtualized computing environment application executing at the second privilege level, a second received request for service;
- the second privilege level is insufficient for the second received request for service;
- the second virtualized computing environment application comprises a VM application;
- the second virtualized computing environment application comprises a container;
- the second received request for service comprises an RPC;
- the second received request for service comprises an API call;
- based on at least receiving the second received request for service, determining that the second virtualized computing environment application is not authorized to perform the second received request for service;
- determining that the second virtualized computing environment application is not authorized to perform the second received request for service comprises: comparing an identity of the second virtualized computing environment application and the second received request for service with privilege exception information;
- based on at least determining that the second virtualized computing environment application is not authorized to perform the second received request for service, returning a failure indication to the second virtualized computing environment application;
- the privilege exception information comprises a predetermined list of application identities and corresponding requests for service subject to privilege exception;
- determining that a virtualized computing environment application is authorized to perform a received request for service further comprises: generating the privilege exception information based on at least a set of exception rules.
- providing an API for the relay service;
- editing the predetermined list of application identities and corresponding requests for service subject to privilege exception;
- editing the set of exception rules;
- providing a UI for editing the predetermined list of application identities or the set of exception rules;
- configuring each of a plurality of applications or virtualized computing environment applications to use the relay service or to bypass the relay service, based on at least the privilege level of each virtualized computing environment application;
- pushing the privilege exception information to a virtual environment running the relay service;
- the virtualized computing environment application and the relay service execute in a common virtual environment;
- storing a log of received requests for service for which a relayed request for service is performed;
- storing a log of received requests for service for which a relayed request for service is not performed;
- determining, by the destination service, that the relayed request for service has a sufficient privilege level;
- based on at least determining that the relayed request for service has a sufficient privilege level, processing, by the destination service, the relayed request for service;
- transmitting the response to the relayed request for service to the relay service;
- the destination service comprises a hypervisor;

the destination service comprises a VMX process;
the destination service comprises a host OS;
transmitting, to the relay service, by a second virtualized computing environment application executing at the second privilege level, a second request for service;
receiving, from the relay service, by the second virtualized computing environment application, a failure indication;
the destination service comprises a remote service across a computer network;
relaying the relayed request for service comprises relaying the relayed request to a remote node across a computer network;
relaying the relayed request for service comprises relaying the relayed request for service using TCP/IP;
receiving, by the relay service, from a second application executing at the second privilege level, a second received request for service;
based on at least receiving the second received request for service, determining that the second application is not authorized to perform the second received request for service;
comparing an identity of the second application and the second received request for service with privilege exception information; and
based on at least determining that the second application is not authorized to perform the second received request for service, returning a failure indication to the second application.

Exemplary Operating Environment

Figure 8:
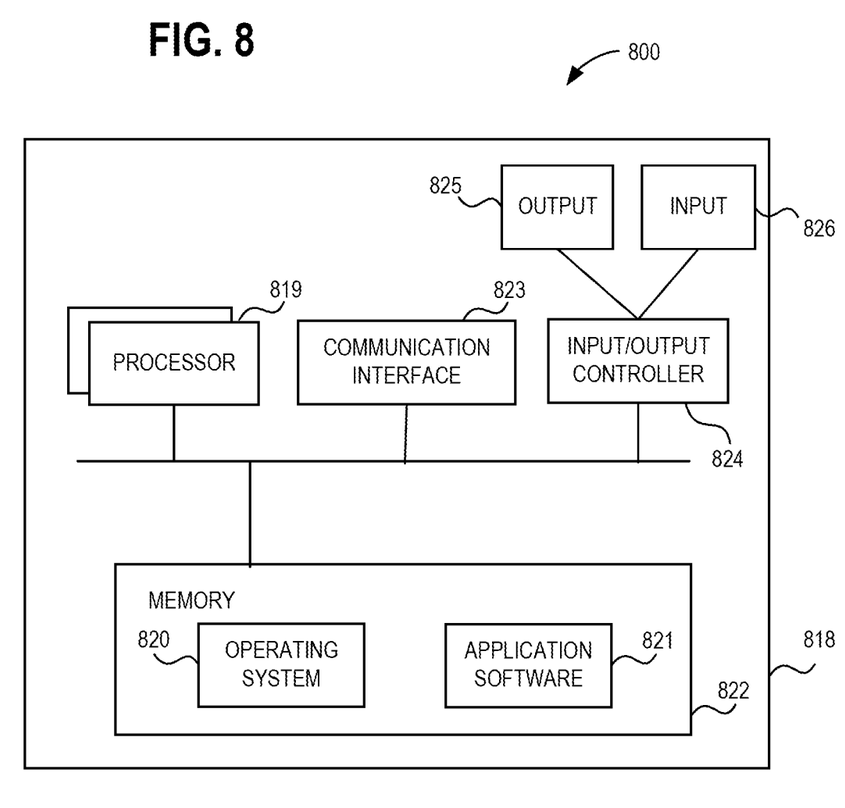
FIG. 8 illustrates a block diagram of a computing apparatus that may be used as a component of the architecture of FIG. 1, according to an example.

The present disclosure is operable with a computing device (computing apparatus) according to an embodiment shown as a functional block diagram 800 in FIG. 8. In an embodiment, components of a computing apparatus 818 may be implemented as part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hardcoded machine. Platform software comprising an operating system 820 or any other suitable platform software may be provided on the computing apparatus 818 to enable application software 821 to be executed on the device. According to an embodiment, the operations described herein may be accomplished by software, hardware, and/or firmware.

Computer executable instructions may be provided using any computer-readable medium (e.g., any non-transitory computer storage medium) or media that are accessible by the computing apparatus 818. Computer-readable media may include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, hard disks, RAM, ROM, EPROM, EEPROM, NVMe devices, persistent memory, phase change memory, flash memory or other memory technology, compact disc (CD, CD-ROM), digital versatile disks (DVD) or other optical storage, magnetic cassettes, magnetic tape, magnetic disk storage, shingled disk storage or other magnetic storage devices, or any other non-transmission medium (e., non-transitory) that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g. using a communication interface 823). Computer storage media are tangible, non-transitory, and are mutually exclusive to communication media.

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone, or a touchpad. In one embodiment, the output device 825 may also act as the input device. An example of such a device may be a touch sensitive display. The input/output controller 824 may also output data to devices other than the output device, e.g. a locally connected printing device. In some embodiments, a user may provide input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements.

The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of privilege enforcement for virtual environments, the method comprising:

receiving, by a relay service executing at a first privilege level, from a first virtualized computing environment application executing at a second privilege level lower than the first privilege level, a first received request for service, wherein the first privilege level is authorized for the first received request for service and the second privilege level is not authorized for the first received request for service;

determining that the first virtualized computing environment application is authorized to perform the first received request for service, wherein the determining comprises:

comparing an identity of the first virtualized computing environment application and the first received request for service with privilege exception information retrieved from a blockchain, the blockchain storing the privilege exception information for security, wherein privilege exception information comprises a list of application identities including the identity of the first virtualized computing environment application, and a respective list of requests for service subject to privilege exception associated with the identity of the first virtualized computing environment application, wherein the respective list of requests for service subject to privilege exception includes requests for service with a respective privilege level higher than the second privilege level but accessible to the first virtualized computing environment application;

based on the comparing, determining that the first virtualized computing environment application is authorized;

based on the determining that the first virtualized computing environment application is authorized, relaying, by the relay service, the first received request to a destination service as a relayed request for processing the first received request, the relayed request having the first privilege level; and based on at least receiving a response to the relayed request for service, relaying the received response to the first virtualized computing environment application.

2. The method of claim 1, wherein the first virtualized computing environment application comprises a virtual machine (VM) application or a container.

3. The method of claim 1, wherein the first received request for service comprises an enumerated remote procedure call (RPC) that specifies a task determined to be necessary for the first virtualized computing environment application, the privilege exception information comprising a key-value pair, the key being an identity of the first virtualized computing environment application and the value being the task.

4. The method of claim 1, wherein the second privilege level comprises non-root or non-administrator user privilege, and the first privilege level comprises a privilege selected from a list consisting of:
root, administrator, superuser, and supervisor.

5. The method of claim 1, further comprising:
receiving, by the relay service, from a second virtualized computing environment application executing at the second privilege level, a second received request for service, wherein the second privilege level is not authorized for the second received request for service;
determining that the second virtualized computing environment application is not authorized to perform the second received request for service, wherein the determining comprises:
comparing an identity of the second virtualized computing environment application and the second received request for service with privilege exception information; and
returning a failure indication to the second virtualized computing environment application.

6. The method of claim 1, wherein determining that the first virtualized computing environment application is authorized to perform the first received request for service further comprises:
generating the privilege exception information based on at least a set of exception rules.

7. A computer system comprising:
a processor; and
a non-transitory computer readable medium having stored thereon program code executable by the processor, the program code causing the processor to:
receive, by a relay service executing at a first privilege level, from a first virtualized computing environment application executing at a second privilege level lower than the first privilege level, a first received request for service, wherein the first privilege level is authorized for the first received request for service and the second privilege level is not authorized for the first received request for service;
determine that the first virtualized computing environment application is authorized to perform the first received request for service, wherein the determining comprises:
compare an identity of the first virtualized computing environment application and the first received request for service with privilege exception information retrieved from a blockchain, the blockchain storing the privilege exception information for security, wherein privilege exception information comprises a list of application identities including the identity of the first virtualized computing environment application, and a respective list of requests for service subject to privilege exception associated with the identity of the first virtualized computing environment application, wherein the respective list of requests for service subject to privilege exception includes requests for service with a respective privilege level higher than the second privilege level but accessible to the first virtualized computing environment application;
based on the comparing, determine that the first virtualized computing environment application is authorized;
based on the determining that the first virtualized computing environment application is authorized, relay, by the relay service, the first received request to a destination service as a relayed request for processing the first received request, the relayed request having the first privilege level; and
based on at least receiving a response to the relayed request for service, relay the received response to the first virtualized computing environment application.

8. The computer system of claim 7, wherein the first virtualized computing environment application comprises a virtual machine (VM) application or a container.

9. The computer system of claim 7, wherein the first received request for service comprises an enumerated remote procedure call (RPC) that specifies a task determined to be necessary for the first virtualized computing environment application, the privilege exception information comprising a key-value pair, the key being an identity of the first virtualized computing environment application and the value being the task.

10. The computer system of claim 7, wherein the second privilege level comprises non-root or non-administrator user privilege, and the first privilege level comprises a privilege selected from a list consisting of:
root, administrator, superuser, and supervisor.

11. The computer system of claim 7, wherein the program code is further operative to:
receiving, by the relay service, from a second virtualized computing environment application executing at the second privilege level, a second received request for service, wherein the second privilege level is not authorized for the second received request for service;
determining that the second virtualized computing environment application is not authorized to perform the second received request for service, wherein the determining comprises:
comparing an identity of the second virtualized computing environment application and the second received request for service with privilege exception information; and
returning a failure indication to the second virtualized computing environment application.

12. The computer system of claim 7, wherein determining that the first virtualized computing environment application is authorized to perform the first received request for service further comprises:
generating the privilege exception information based on at least a set of exception rules.

13. A non-transitory computer storage medium having stored thereon program code executable by a processor, the program code embodying a method comprising:
receiving, by a relay service executing at a first privilege level, from a first virtualized computing environment application executing at a second privilege level lower than the first privilege level, a first received request for service, wherein the first privilege level is authorized for the first received request for service and the second privilege level is not authorized for the first received request for service;

determining that the first virtualized computing environment application is authorized to perform the first received request for service, wherein the determining comprises:
- comparing an identity of the first virtualized computing environment application and the first received request for service with privilege exception information retrieved from a blockchain, the blockchain storing the privilege exception information for security, wherein privilege exception information comprises a list of application identities including the identity of the first virtualized computing environment application, and a respective list of requests for service subject to privilege exception associated with the identity of the first virtualized computing environment application, wherein the respective list of requests for service subject to privilege exception includes requests for service with a respective privilege level higher than the second privilege level but accessible to the first virtualized computing environment application;
- based on the comparing, determining that the first virtualized computing environment application is authorized;
- based on the determining that the first virtualized computing environment application is authorized, relaying, by the relay service, the first received request to a destination service as a relayed request for processing the first received request, the relayed request having the first privilege level; and
- based on at least receiving a response to the relayed request for service, relaying the received response to the first virtualized computing environment application.

14. The computer storage medium of claim 13, wherein the first virtualized computing environment application comprises a virtual machine (VM) application or a container.

15. The computer storage medium of claim 13, wherein the first received request for service comprises an enumerated remote procedure call (RPC) that specifies a task determined to be necessary for the first virtualized computing environment application, the privilege exception information comprising a key-value pair, the key being an identity of the first virtualized computing environment application and the value being the task.

16. The computer storage medium of claim 13, wherein the second privilege level comprises non-root or non-administrator user privilege, and the first privilege level comprises a privilege selected from a list consisting of:
root, administrator, superuser, and supervisor.

17. The computer storage medium of claim 13, wherein the program code further comprises:
- receiving, by the relay service, from a second virtualized computing environment application executing at the second privilege level, a second received request for service, wherein the second privilege level is not authorized for the second received request for service;
- determining that the second virtualized computing environment application is not authorized to perform the second received request for service, wherein the determining comprises:
  - comparing an identity of the second virtualized computing environment application and the second received request for service with privilege exception information; and
- returning a failure indication to the second virtualized computing environment application.

* * * * *